United States Patent Office 2,725,895
Patented Dec. 6, 1955

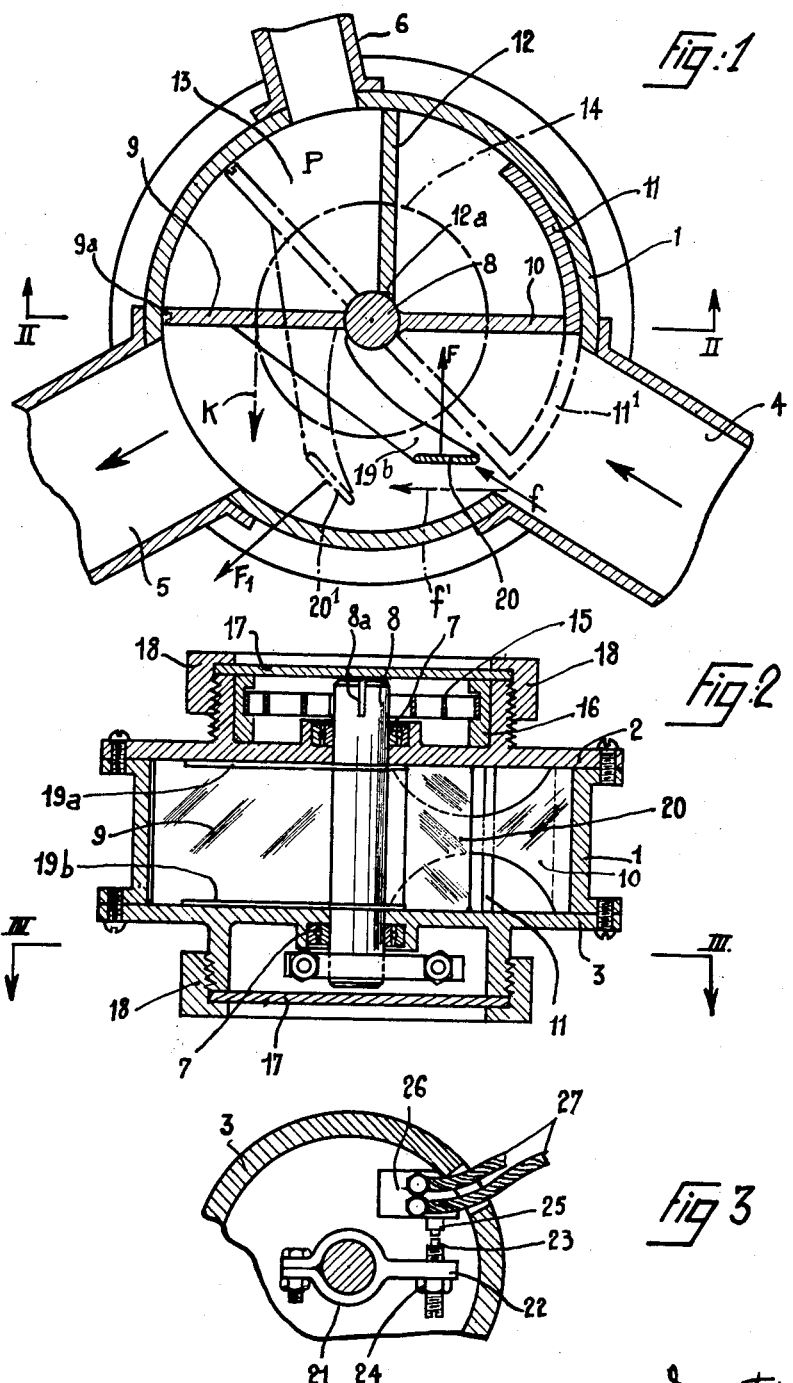

2,725,895
FLOW-REGULATORS FOR FLUIDS

Julien Chanrion and Jean Mottais, Saint-Nazaire, France, assignors to Societe Nationale de Constructions Aeronautiques du Sud-Ouest (Societe Anonyme), Paris, France, a company of France Application March 18, 1953, Serial No. 343,205

Claims priority, application France March 20, 1952

4 Claims. (Cl. 137—505.14)

It is sometimes necessary to supply certain kinds of apparatus with a constant quantity of liquid or of gas of any kind, with air for example, particularly in connection with the supply of fuel or of air for combustion in burners.

It frequently happens, however that the pressure under which the fluid is supplied is variable. It then becomes necessary to interpose a flow-regulator in the supply piping system.

The invention relates to a regulator of this kind which will be described in connection with the particular case of a supply of gas, but it should be understood that it may also be applied to liquids.

The flow-regulator in accordance with the invention comprises a cylindrical casing, the lateral side of which is provided with two openings almost opposite to each other, one being for the entry of the fluid, the other for its outlet. Inside the casing, there is provided a moving system arranged to pivot about the axis of the cylinder, the system being controlled by an approximately constant restoring couple, and comprising on the one side a plate which forms a substantially fluid-tight radial partition in the casing, which partition is subjected on one of its sides to the pressure of the fluid passing through the casing, the other side of the moving system comprising a shutter or closure member for the inlet of the fluid, the other face of the said partition forming in conjunction with a fixed radial partition inside the casing, a compartment inside which there is maintained a constant datum pressure.

When the moving system is in equilibrium, the pressure of the fluid passing through the casing and acting on the partition, balances at the same time the datum pressure and the restoring couple. As this couple and the datum pressure are both constant, the pressure of the fluid passing through the casing is itself constant and, in consequence, the flow is made uniform. If this pressure tends to vary at the inlet orifice of the casing, the moving system is displaced about its axis, thereby moving the closure member, and the moving system takes up a new position of equilibrium. The variable loss of pressure caused by the closure member thus ensures a constant pressure at the outlet orifice in spite of the variations in pressure at the inlet orifice.

In the case of fixed installations, it is easy to arrange a constant restoring couple which acts on the moving system. Such a couple can, for example, be obtained by means of a simple counter-weight.

On the other hand, in the case of mobile installations such as, for example, on board aircraft, the restoring force can hardly be obtained except by means of elastic elements. Now, elements of this kind do not furnish a constant restoring couple but a couple which is proportional to the degree of their deformation. In this case, according to the invention, the moving system is supplemented by an aerodynamic or hydrodynamic corrector device for the said restoring couple.

In one advantageous form of embodiment, this corrector device is constituted by a vane integral with the moving system and arranged in the path of the fluid flow passing through the casing, in such a way that the dynamic reaction of the flow upon this vane supplies a couple which varies in the opposite sense to the restoring couple.

When the incoming pressure inside the regulator is null or negligible, the moving system under the control of the restoring couple comes up against a stop in the position corresponding to full opening of the flow-regulator. In accordance with the invention also, this stop is constituted by an electric contact. If this contact is closed in said position, it may operate a warning system indicating the insufficiency of pressure at the entry of the regulator. If, on the other hand, this contact is open in said position, it may be used to prevent the utilisation of an apparatus subordinated to the regulator, by preventing the flow of electric current in this apparatus.

The description which follows below with reference to the accompanying drawings (which are given by way of example and not in any sense of limitation) will make it quite clear how the invention can be carried into effect.

Fig. 1 is a cross-section perpendicular to the axis of the casing of a flow-regulator in accordance with the invention. This cross-section corresponds in its general aspect to the section line I—I of Fig. 2.

Fig. 2 is a cross-section along the line II—II of Fig. 1, the moving system being shown as remaining unsectioned.

Fig. 3 is a cross-section along the line III—III of Fig. 2.

The flow-regulator shown in these drawings comprises a cylindrical casing made up of a lateral wall 1 to the two extremities of which are fixed the base members or end-plates 2 and 3. The gas intake piping system 4 and the gas outlet piping system 5 are connected to the lateral wall 1 almost opposite each other. To this same wall is connected, in addition, a piping system 6 connected to a closed system in which there is maintained a constant gas pressure (the datum or reference pressure), this gas being preferably of the same nature as that which passes through the casing. In the case of air supply, the piping system 6 can lead directly to atmosphere.

In the base members 2 and 3 which close the casing, are housed the bearings 7, which may, for example, be ball bearings on which rotates an axle 8 which carries the moving system. This moving system is constituted by a radial partition 9, the edges of which adjacent to the walls of the casing are provided along their length with slots 9a (labyrinth packing) which ensure the fluid tightness of this partition in the casing, both along the lateral wall and along those sides adjacent to the base members 2 and 3, without however appreciably hindering the free rotation of this partition inside the casing. On the opposite side of the partition 9, the shaft 8 carries a radial arm 10 which supports the member 11 of the gas inlet partition 4. This closure member is a sector of a cylinder, the height of which is a little less than that of the casing and the developed length of which is at least equal to that of the inlet opening 4, so that it can completely close the inlet opening.

In the interior of the casing, there is provided a fixed radial wall 12, the internal edge of which is almost in contact with the shaft 8, and is provided with a slot 12a, for fluid tightness. The moving partition 9 and the wall 12 form, inside the casing, a compartment 13 in which is maintained the pressure from the piping system 6.

In that portion of the apparatus which has just been described, we shall suppose that the casing is fixed with the axle 8 horizontal, and it will furthermore be supposed that on this shaft, on the outside of the casing, there is fixed a pulley 14 around which is wound a wire at the free end of which there is suspended a weight which exerts a force K. The moving system is thereby subjected to a constant restoring couple of anti-clockwise direction in Fig. 1 which tends to open the inlet 4. It will finally be supposed that the constant datum pressure P is maintained in the compartment 13.

If there is supplied, through the piping system 4, a gas at a pressure appreciably higher than P, the moving system, which is supposed to be in static equilibrium about its axis, is subjected to the following forces:

(1) The constant restoring couple supplied by the force K, (2) A constant force exerted in the same sense as the force K, which results from the static pressure obtaining in the chamber 13 and which acts upon the upper face of the partition 9 in the case shown in Fig. 1, (3) A force acting in opposition to the first two forces, and which results from the static pressure of the gas passing through the casing, which pressure acts upon the lower face of the partition 9.

If this third force is greater than the sum of the two others, the moving system turns in clockwise direction and therefore the shutter member 11 partly closes the inlet of the piping system 4. There results in the casing, a fall of pressure of the gas which enters through this piping system and, in consequence, the moving system takes up a certain position of equilibrium. At the point of balance, the pressure in the casing is equal to the pressure P increased by the constant pressure required to overcome the constant restoring couple supplied by the force K, or, in other words, gas at a constant pressure passes out through the piping system 5 at a constant rate of flow, since the section of this latter piping system remains unaltered.

It will be noted that the restoring couple of the force K determines the value of the excess gas pressure with reference to the datum pressure; in order to control the rate of flow, it is thus possible, depending on the case considered, to vary either the value of the datum pressure or the value of the force K.

If the gas pressure in the inlet piping system increases, the moving system rotates in the direction of the hands of a watch, with reference to Fig. 1, in such a way as to close a little more the gas inlet orifice until the pressure inside the casing is brought back to its initial value, which is obtained when the moving system is once more in equilibrium.

It is clear that the moving system will rotate in the opposite direction when the pressure on the inlet side of the piping system 4 is reduced.

An apparatus of this kind can hardly be utilised, however, in a mobile installation, particularly when this latter is likely to take up any position whatever in space, as is the case with an aircraft installation. In installations of this latter kind, it is preferable to use a restoring couple supplied by an elastic member.

In the embodiment shown in the drawings, this elastic member consists of a spiral spring 15, the internal end of which is fixed in the slot 8a, at the upper end of the shaft 8, whilst the external end of the spring is secured to a circular drum 16 housed in a hollowed out portion of the base member 2. In this embodiment, the hollowed out portion of the base is externally threaded, by means of which this hollowed out portion can be closed by the addition of a cover member 17, secured in place by a screwed ring 18. The lower base member 3 is identical with the base member 2, but its hollowed out portion contains another device which will be described later. This hollowed out portion is also closed by an identical cover member 17 and a threaded ring 18.

The spring 15 applies to the shaft 8 a restoring couple, which, in this case, is not constant but is proportional to the deformation of the spring. In order to compensate for the variation in the restoring couple, the moving system is provided with two flat arms 19a, 19b, arranged close to the base members 2 and 3 so as not to impede the passage of the gas through the casing. These arms support a vane 20 which is practically of the same height as that of the casing and which, by means of the connecting arms, rotates together with the moving system. As can be seen in Fig. 1, this vane makes a certain angle with the radial direction so that its external face is turned towards the inlet 4 when the inlet 4 is fully open (in full lines in Fig. 1) and it is located in the vicinity of the said inlet.

As may be readily seen in Fig. 1, the flow of gas entering through the inlet 4 when the moving system is in that position (in full lines), impinges on the external face of this vane (arrow $f$), and, as a result, exerts on this vane a thrust of which the useful component has a direction shown by the arrow F. This force tends to rotate the moving system in a direction opposite to the movement of the hands of a watch, or in other words, this force is additive to the action of the spring 15.

On the other hand, when the moving system is close to its other extreme position, at which the gas inlet piping system is shut off (the shutter member is shown at the position $11^1$ in dotted lines) the vane has reached the position $20^1$. In this position, the internal face of the vane 20 is turned towards the inlet 4 the flow of gas, deflected somewhat by the presence of the shutter member (arrow $f^1$) impinges on said internal face and the useful component of the thrust applied to the vane, which is about equal to that in the previous case, has then the direction $F^1$, that is to say a direction opposite to that of the force F. The force $F^1$, which has the same mechanical advantage as the force F, thus tends to rotate the moving system in the same direction as the hands of a watch, or in other words, it acts in opposition to the force exerted by the spring, which at that moment is a maximum.

At a certain intermediate position, the force F (the lift of the aerofoil 20) is zero and there is only left the drag component, approximately constant for all positions of the vane and which may be neglected or systematically compensated for by a suitable increase in the force of the restoring couple which is constantly in opposition to it. In addition, the vane may be given an aerodynamic section in order to reduce its drag.

In this position, which is roughly the means position, the restoring couple can be considered as being supplied by the spring alone and, by virtue of the compensatory effect supplied by the vane, this average couple is kept approximately constant for all positions of the moving system. For the same reasons as have been explained above, the apparatus thus supplies a constant gas flow.

On the other end of the shaft 8, enclosed in the hollowed out portion of the lower base member, is fixed a collar 21 which carries a stop arm 22. In this stop arm is disposed an adjustable stop screw 23, provided with a lock-nut 24. The extremity 23a of the screw operates a push-button 25 of an electric switch 26, arranged in a circuit formed by the conductors 27 which pass into the hollowed out portion of the lower base member through an opening of any kind.

When the pressure in the piping system 4 is negligibly low or only slightly higher than the pressure P, the restoring force (whether it is supplied by a counterweight or by a spring) forces the end of the screw 23 against the push-button 25 and operates the switch. The circuit of the conductor 27 can include a warning device, either operating by sound or by light, which is put into operation if the switch is closed by the thrust of the screw 23. The circuit of the conductors 27 can also control an apparatus ancillary to the regulator, for example the electric ignition circuit of a burner, and if the switch 26 is opened by the thrust of the screw 23, the circuit being broken, the apparatus in question cannot be put in service.

The form of embodiment shown in the drawings offers the advantage of affording a convenient method of control either of the initial tension of the spring 15 (by rotation of the drum 16), or of the position of the stop member 23 for the movement of the moving system. The symmetry of the embodiment confers a high degree of flexibility on the application of the apparatus and has also the advantage of reducing, in addition, the cost of manufacture.

It will be well understood that modifications may be made to the flow-regulator which has been described, in particular by the substitution of equivalent technical means, without thereby departing from the spirit or scope of the present invention.

What we claim is:

1. A flow regulating device comprising a casing bounded by a generally cylindrical wall, an inlet passage and an outlet passage opening into said casing through spaced parts of said wall, a movable valve member for varying the flow area of said inlet passage, a source of substantially constant reference pressure, an angularly movable partition inside said casing subject to the differential action of said reference pressure and the static pressure of the flow through said casing, connecting means between said partition and said valve member for restricting said flow area when said static pressure increases and for enlarging said flow area when said static pressure decreases, distortable resilient means for urging said partition in a direction opposite to that of said static pressure thereon with a force which varies according to the amount of distortion of said resilient means, an angularly movable, generally streamlined blade disposed inside said casing within said flow and subject to its dynamic action which varies according to the angular position of said blade with respect to the stream lines of said flow, and connecting means between said blade and said partition for angularly displacing said blade as said partition is angularly displaced and for transmitting to said partition the variable force corresponding to said variable dynamic action on said blade, the variations of said latter-mentioned force substantially compensating for the variations of said former-mentioned force exerted by said distortable resilient means.

2. Flow regulating device as claimed in claim 1, wherein the blade is fast with the partition, whereby said blade and said partition are subject to simultaneous and identical angular displacements as the static pressure of the flow varies.

3. Flow regulating device as claimed in claim 1, wherein the blade is so designed that the dynamic action exerted thereon by the flow varies in a continuous manner with the angular position of said blade and wherein the force corresponding to said dynamic action substantially cancels before changing its direction as the blade moves through an intermediate angular position.

4. Flow regulating device as claimed in claim 1, wherein the valve member is angularly movable and fast with the partition, whereby said valve member and said partition are subject to simultaneous and identical angular displacements as the static pressure of the flow varies.

References Cited in the file of this patent

UNITED STATES PATENTS

| | | |
|---|---|---|
| 1,201,240 | Benjamin | Oct. 17, 1916 |
| 1,293,895 | Olson | Feb. 11, 1919 |
| 1,602,989 | Montgomery | Oct. 12, 1926 |
| 1,898,244 | Dodrill | Feb. 21, 1933 |